(12) United States Patent
Ji et al.

(10) Patent No.: US 8,445,164 B2
(45) Date of Patent: May 21, 2013

(54) ELECTRODE CONTAINING NANOSTRUCTURED THIN CATALYTIC LAYERS AND METHOD OF MAKING

(75) Inventors: Chunxin Ji, Penfield, NY (US); Matthew Dioguardi, Rochester, NY (US); Sumeet Bhargava, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 187 days.

(21) Appl. No.: 12/788,915

(22) Filed: May 27, 2010

(65) Prior Publication Data

US 2011/0294037 A1    Dec. 1, 2011

(51) Int. Cl.
*H01M 8/00*    (2006.01)
*H01M 4/02*    (2006.01)
*H01M 4/36*    (2006.01)
*H01M 4/62*    (2006.01)
*H01M 4/88*    (2006.01)

(52) U.S. Cl.
USPC ............ 429/535; 429/523; 429/532; 502/101

(58) Field of Classification Search .......... 429/482–484, 429/523–535; 427/115; 502/101
See application file for complete search history.

(56) References Cited

U.S. PATENT DOCUMENTS

| | | | |
|---|---|---|---|
| 4,812,352 A | 3/1989 | Debe | |
| 4,940,854 A | 7/1990 | Debe | |
| 5,039,561 A | 8/1991 | Debe | |
| 5,175,030 A | 12/1992 | Lu et al. | |
| 5,238,729 A | 8/1993 | Debe | |
| 5,273,615 A | 12/1993 | Asetta et al. | |
| 5,336,558 A | 8/1994 | Debe | |
| 5,338,430 A | 8/1994 | Parsonage et al. | |
| 5,674,592 A | 10/1997 | Clark et al. | |
| 5,879,827 A | 3/1999 | Debe et al. | |
| 5,879,828 A | 3/1999 | Debe et al. | |
| 6,238,534 B1 | 5/2001 | Mao et al. | |

(Continued)

FOREIGN PATENT DOCUMENTS

| | | |
|---|---|---|
| CN | 1471186 A | 1/2004 |
| CN | 1560949 A | 1/2005 |

(Continued)

OTHER PUBLICATIONS

T. Hatanaka, et al., PEFC Electrodes Based on Vertically Oriented Carbon Nanotubes, 210th ECS Meeting, Abstract #549, 2006.

(Continued)

*Primary Examiner* — Basia Ridley
*Assistant Examiner* — James Lee
(74) *Attorney, Agent, or Firm* — Dinsmore & Shohl LLP

(57) ABSTRACT

A method of making an electrode is provided. The method includes providing an electrocatalyst decal comprising a carrying substrate having a nanostructured thin catalytic layer thereon; providing a transfer substrate with an adjacent adhesive layer; adhering the nanostructured thin catalytic layer adjacent to the adhesive layer to form a composite structure; removing the carrying substrate from the composite structure; and removing the transfer substrate from the composite structure to form the stand-alone nanostructured thin catalytic film comprising the adhesive layer with the nanostructured thin catalytic layer adhered thereto. A stand alone nanostructured thin catalytic film and methods of constructing electrodes with the stand alone nanostructured thin catalytic films are also described.

18 Claims, 10 Drawing Sheets

U.S. PATENT DOCUMENTS

| | | | |
|---|---|---|---|
| 6,482,763 | B2 | 11/2002 | Haugen et al. |
| 6,521,324 | B1 * | 2/2003 | Debe et al. .................... 156/235 |
| 6,524,736 | B1 | 2/2003 | Sompalli et al. |
| 6,669,801 | B2 | 12/2003 | Yoshimura et al. |
| 6,770,337 | B2 | 8/2004 | Debe et al. |
| 7,041,373 | B2 | 5/2006 | Mukasa et al. |
| 7,419,741 | B2 | 9/2008 | Vernstrom et al. |
| 2003/0022403 | A1 | 1/2003 | Shimoda et al. |
| 2005/0067345 | A1 | 3/2005 | Prugh et al. |
| 2005/0095494 | A1 | 5/2005 | Fuss et al. |
| 2005/0233198 | A1 | 10/2005 | Nuzzo et al. |
| 2006/0204831 | A1 | 9/2006 | Yan et al. |
| 2007/0059452 | A1 | 3/2007 | Debe et al. |
| 2007/0059573 | A1 | 3/2007 | Debe et al. |
| 2007/0082256 | A1 | 4/2007 | Debe et al. |
| 2007/0082814 | A1 | 4/2007 | Debe et al. |
| 2007/0199649 | A1 * | 8/2007 | Sompalli et al. .............. 156/280 |
| 2008/0020253 | A1 | 1/2008 | Neubert et al. |
| 2008/0020261 | A1 | 1/2008 | Hendricks et al. |
| 2008/0020923 | A1 | 1/2008 | Debe et al. |
| 2008/0143061 | A1 | 6/2008 | Steinbach et al. |
| 2008/0145712 | A1 | 6/2008 | Pierpont et al. |
| 2008/0182150 | A1 | 7/2008 | De Haan et al. |

FOREIGN PATENT DOCUMENTS

| | | |
|---|---|---|
| CN | 101263619 A | 9/2008 |
| EP | 1 381 102 A2 | 1/2004 |
| WO | 2007032903 A2 | 3/2007 |

OTHER PUBLICATIONS

Scott C. Warren, et al., "Ordered Mesoporous Materials from Metal Nanoparticle-Block Copolymer Self-Assembly", Science vol. 320, pp. 1748-1752, Jun. 27, 2008.

Chia-Liang Sun, et al., "Ultrafine Platinum Nanoparticles Uniformly Dispersed on Arrayed CNx Nanotubes with High Electrochemical Activity", Chem.Mater. 2005, 17, 3749-3753.

Mark K. Debe, et al., "Advanced MEAs for Enhanced Operating Conditions", FY 2005 Progress Report, DOE Hydrogen Program, pp. 730-738.

Mark K. Debe, "Advanced MEAs for Enhanced Operating Conditions, Amenable to High Volume Manufacture", 3M/DOE Cooperative Agreement No. DE-FC36-02AL67621, Fuel Components Program, 3M Company, May 24, 2004, pp. 1-27.

Mark K. Debe, "NanoStructured Thin Film Catalysts (NSTFC) for Next Generation PEM Fuel Cells", Fuel Cell Components Program, Northern Nano Workshop, Nov. 9, 2006, University of Minnesota, pp. 1-38.

Non-Final Office Action dated Nov. 19, 2012 pertaining to U.S. Appl. No. 12/718,306, filed Mar. 5, 2010.

Non-Final Office Action dated Nov. 26, 2012 pertaining to U.S. Appl. No. 12/718,330, filed Mar. 5, 2010.

Non-Final Office Action dated Oct. 13, 2011 pertaining to U.S. Appl. No. 12/465,913, filed May 14, 2009.

Non-Final Office Action dated Apr. 13, 2012 pertaining to U.S. Appl. No. 12/465,913, filed May 14, 2009.

Non-Final Office Action dated Feb. 1, 2013 pertaining to U.S. Appl. No. 12/701,095, filed Feb. 5, 2010.

* cited by examiner

ELECTRODE CONTAINING NANOSTRUCTURED THIN CATALYTIC LAYERS AND METHOD OF MAKING

STATEMENT OF RELATED CASES

This application is related to U.S. application Ser. No. 12/465,913 filed May 14, 2009, entitled ELECTRODE CONTAINING NANOSTRUCTURED THIN CATALYTIC LAYERS AND METHOD OF MAKING; U.S. application Ser. No. 12/718,330, filed Mar. 5, 2010, entitled FABRICATION OF ELECTRODES WITH MULTIPLE NANOSTRUCTURED THIN CATALYTIC LAYERS; U.S. application Ser. No. 12/718,306, filed Mar. 5, 2010, entitled FABRICATION OF CATALYST COATED DIFFUSION MEDIA LAYERS CONTAINING NANOSTRUCTURED THIN CATALYTIC LAYERS; and U.S. application Ser. No. 12/701,095, filed Feb. 5, 2010, entitled PREPARATION OF NANOSTRUCTURED THIN CATALYTIC LAYER-BASED ELECTRODE INK, all of which are incorporated herein by reference.

FIELD OF THE INVENTION

The present invention relates generally to electrodes for fuel cells, and specifically to electrodes containing nanostructured thin catalytic layers, and methods of making them.

BACKGROUND OF THE INVENTION

Electrochemical conversion cells, commonly referred to as fuel cells, produce electrical energy by processing reactants, for example, through the oxidation and reduction of hydrogen and oxygen. A typical polymer electrolyte fuel cell comprises a polymer membrane (e.g., a proton exchange membrane (PEM)) with catalyst layers on both sides. The catalyst coated PEM is positioned between a pair of gas diffusion media layers, and a cathode plate and an anode plate are placed outside the gas diffusion media layers. The components are compressed to form the fuel cell.

The currently widely used fuel cell electrocatalysts are platinum nanoparticles supported on carbon supports. Depending on the catalysts and loading, the electrodes prepared with carbon supported platinum catalysts normally have thickness from several microns to about 10 or 20 microns with porosities varying from 30% to 80%. One of the disadvantages of these carbon supported catalysts is the poor corrosion resistance of carbon under certain fuel cell operating conditions, which results in fast performance degradation.

The catalyst layers can be made of nanostructured thin support materials. The nanostructured thin support materials have particles or thin films of catalyst on them. The nanostructured thin catalytic layers can be made using well known methods. One example of a method for making nanostructured thin catalytic layers is described in U.S. Pat. Nos. 4,812,352, 4,940,854, 5,039,561, 5,175,030, 5,238,729, 5,336,558, 5,338,430, 5,674,592, 5,879,827, 5,879,828, 6,482,763, 6,770,337, and 7,419,741, and U.S. Publication Nos. 2007/0059452, 2007/0059573, 2007/0082256, 2007/0082814, 2008/0020261, 2008/0020923, 2008/0143061, and 2008/0145712, which are incorporated herein by reference. The basic process involves depositing a material on a substrate, such as polyimide, and annealing the deposited material to form a layer of nanostructured support elements, known as whiskers. One example of a material which can be used to form the nanostructured support elements is "perylene red" (N,N'-di(3,5-xylyl)perylene-3,4,9,10 bis(dicarboximide) (commercially available under the trade designation "C. I. PIGMENT RED 149" from American Hoechst Corp. of Somerset, N.J.)). A catalyst material is then deposited on the surface of nanostructured support elements to form a nanostructured thin film (NSTF) catalyst layer, which is available from 3M.

The nanostructured thin catalytic layers can be transferred directly to a proton exchange membrane, such as a Nafion® membrane, using a hot press lamination process, for example. The polyimide substrate is then peeled off, leaving the layer of whiskers attached to the membrane.

These types of nanostructured thin catalytic layers have demonstrated high catalytic activities, which is helpful to reduce the platinum utilization in fuel cell stacks. Most importantly, because the supporting layer is not made of carbon as in the traditional platinum catalysts for fuel cell application, the nanostructured thin catalytic layers are more resistant to corrosion under certain fuel cell operating conditions, and thus improve the fuel cell's durability.

However, after the annealing process is completed, a thin layer of residual non-crystallized perylene red remains at/near the surface of the polyimide substrate. Therefore, when the whiskers have been transferred to the PEM and the polyimide substrate peeled off, the surface of the whiskers that was adjacent to the polyimide substrate is exposed and becomes the surface of membrane electrode assembly (MEA), which interfaces with the gas diffusion media. Consequently, the residual non-crystallized perylene red backing, which originally was adjacent to the polyimide substrate, is exposed. This can be detrimental to the fuel cell operation because it can block water and the transfer of gases in and out of the electrode.

In addition, a MEA made with this type of whisker catalyst layer has a narrow range of operating conditions (i.e., it cannot be too dry or too wet) to provide good performance. If the fuel cell is operated under wet conditions, the thin layer of whiskers, which is less than 1 µm thick, cannot provide enough storage capacity for the product water, resulting in flooding. Under dry conditions, it is believed that not all portions of the whiskers are utilized to catalyze the reaction due to poor proton transfer characteristics.

Besides the NSTF whisker catalyst described above, there are other uniformly dispersed (or dispersed with a desired pattern) catalytic nanostructured materials prepared on a substrate. For example, aligned carbon nanotubes, aligned carbon nanofibers, or nanoparticles, and the like could be grown on silicon or other substrates. Catalytic materials are then deposited onto the nanostructured materials. Electrocatalyst decals incorporating such materials are described, for example, in Hatanaka et al., PEFC Electrodes Based on Vertically Oriented Carbon Nanotubes, 210$^{th}$ ECS Meeting, Abstract #549 (2006); Sun et al., Ultrafine Platinum Nanoparticles Uniformly Dispersed on Arrayed $CN_x$ Nanotubes with High Electrochemical Activity, Chem. Mater. 2005, 17, 3749-3753; Warren et al., Ordered Mesoporous Materials from Metal Nanoparticle-Block Copolymer Self-Assembly, Science Vol. 320, 1748-1752 (27 Jun. 2008).

Therefore, there is a need for processing and constructing an electrode, containing various types of nanostructured thin catalytic layers, which can provide good performance over a wider range of operating conditions.

SUMMARY OF THE INVENTION

In one embodiment, a method of making an electrode is provided. The method includes providing an electrocatalyst decal comprising a carrying substrate having a nanostructured thin catalytic layer thereon; providing a transfer substrate with an adjacent adhesive layer; adhering the nanostructured thin catalytic layer adjacent to the adhesive layer to form a composite structure; removing the carrying substrate from the composite structure; and removing the transfer substrate from the composite structure to form the stand-alone nanostructured thin catalytic film comprising the adhesive layer with the nanostructured thin catalytic layer adhered thereto.

In another embodiment, a stand alone nanostructured thin catalytic film is provided. The stand alone nanostructured thin catalytic film includes an adhesive layer; and a nanostructured thin catalytic layer adhered to the adhesive layer.

In another embodiment, methods of constructing electrodes with the stand alone nanostructured thin catalytic films are also provided. Methods for fabrication of catalyst coated diffusion media and catalyst coated membrane are described, as well as methods of making electrode inks.

BRIEF DESCRIPTION OF THE DRAWINGS

The following detailed description of specific embodiments of the present invention can be best understood when read in conjunction with the following drawings, where like structure is indicated with like reference numerals, where various components of the drawings are not necessarily illustrated to scale, and in which.

DETAILED DESCRIPTION

This invention provides methods of transferring a nanostructured thin catalytic layer from the carrying substrate to a transfer substrate coated with an adhesive. The carrying substrate can be the substrate the nanostructured thin catalytic layer was grown on or carried on. The transfer substrate that the nanostructured thin catalytic layer will be transferred to is pre-coated with a thin layer of adhesive. The adhesive layer with the nanostructured thin catalytic layer is then peeled off of the transfer substrate, forming a stand alone nanostructured thin catalytic film. In order to transfer the nanostructured thin catalytic layer from its carrying substrate to the transfer substrate, the adhesion strength of the adhesive layer to the transfer substrate must be greater than that of the nanostructured thin catalytic layer to the carrying substrate. The stand alone nanostructured thin catalytic film has sufficient integrity that it can be handled and processed. The catalyst loading (mg/cm$^2$) of the stand alone nanostructured thin catalytic film is essentially the same as the nanostructured thin catalytic layer on the carrying substrate.

The stand alone nanostructured thin catalytic film can be further processed as needed. For example, the stand alone nanostructured thin catalytic film can be placed in a solvent to remove the adhesive and release the nanostructured thin catalytic elements. The nanostructured thin catalytic elements can then be re-dispersed with other components and made into an electrode ink. In another embodiment, the stand alone nanostructured thin catalytic film can be placed on the microporous layer (MPL) side of a diffusion media (DM), and coated with a solvent to remove the adhesive to form a catalyst coated diffusion media (CCDM). In still another embodiment, the stand alone nanostructured thin catalytic film can be placed on a porous substrate and coated with a solvent to remove the adhesive. The nanostructured thin catalytic layer will be loose laid on the porous substrate, and it can be further cleaned and processed as desired. In another embodiment, the stand alone nanostructured thin catalytic films can be stacked to form multilayer electrode structures. In another embodiment, additional layers can be deposited on or in-between the nanostructured thin catalytic layers, which can then be used to form CCDM or catalyst coated membranes (CCM). In another embodiment, additional particles can be included in the adhesive layer. The interlayers would thus be formed when the adhesive is removed without the necessity of an additional coating step.

By adjacent, we mean next to, but not necessarily directly next to. There can be one or more intervening layers, as discussed below.

Figure 1A:
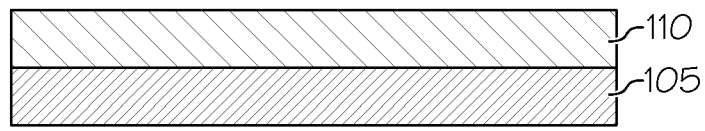
FIGS. 1A-D are an illustration of a general method of fabricating a stand alone nanostructured thin catalytic film according to one or more embodiments of the present invention.

FIGS. 1A-D illustrate the general steps involved in various embodiments of methods of making stand alone nanostructured thin catalytic films. FIG. 1A shows a transfer substrate 105 coated with an adhesive layer 110. The adhesive layer should be easily released from the transfer substrate after the nanostructured thin catalytic layer is transferred. The surface smoothness of the transfer substrate will affect the adhesion strength of the adhesive layer to the transfer substrate. Therefore, the surface roughness of the transfer substrate can be used to adjust the adhesion strength of the adhesive layer to the transfer substrate to ensure the transfer of the nanostructured thin catalyst layer from its carrying substrate. Stiff transfer substrates are preferred for easy removal of the adhesive layer with the nanostructured thin catalytic layer. The transfer substrate can be non-porous or porous, as desired. Non-porous transfer substrates are preferred. Suitable substrates include, but are not limited to polytetrafluoroethylene (PTFE), fluorinated ethylene propylene (FEP), polyvinylidene fluoride (PVDF), and polyethylene (PE). PTFE is desirable as a transfer substrate because it can be re-used, if desired, and PE is desirable if the material cost is a major consideration.

The adhesive layer 110 acts as a temporary glue which adheres the nanostructured thin catalytic layer and the transfer substrate together, allowing the removal of the nanostructured thin catalytic layer from the carrying substrate. Any suitable adhesive can be used. The adhesion strength of the adhesive to the transfer substrate must be greater than that of the nanostructured thin catalytic layer to the carrying substrate. The surface roughness of the transfer substrate can be used to adjust the adhesion strength of the adhesive layer to the transfer substrate. Desirably, the adhesive is easily removable, and does not poison the catalyst and the proton exchange membrane. Water soluble adhesives are desirable because they can be easily removed with water. However, other solvents can be used to remove the adhesive, if desired. Suitable adhesives include, but are not limited to, polyvinyl alcohol (PVA), polyethylene oxide, polyacrylate, polyethylene vinyl acetate, and soluble cellulose. One suitable adhesive is a water soluble PVA, for example, a water soluble PVA having a molecular weight (MW) of about 10,000.

Generally, the adhesive layer loading or thickness is determined by the surface roughness feature of the nanostructured thin catalytic layer on the carrying substrate and the handling requirements after the stand alone nanostructured thin catalytic film is peeled off the transfer substrate. The handling requirements should be balanced with the adhesive removal requirements. Thicker adhesive layers are desirable for handling purposes, while thinner adhesive layers are preferred for ease of adhesive removal. A PVA layer ranging 5 to about 10 µm thick is sufficient to remove the 3M NSTF whisker catalyst layer and maintain the film integrity.

The adhesive layer can optionally include one or more additional materials, including, but not limited to, carbon powder, carbon fibers, a catalyst, titanium dioxide, silica, nanofibers, or nanotubes, if desired. If the adhesive layer contains one or more additional materials, there should be sufficient adhesive in the layer so that the nanostructured thin catalytic layer will adhere to it. Ionomer can also be added into the adhesive layer, if desired. But caution should be exercised to ensure that the addition of ionomer in the adhesive layer does not interfere with subsequent fabrication processes.

Figure 1B:
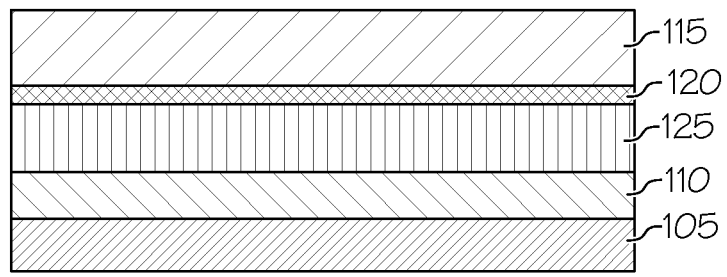

As shown in FIG. 1B, an electrocatalyst decal is placed in contact with the adhesive layer 110. The electrocatalyst decal includes a carrying substrate 115 with nanostructured thin catalytic layer 125 on it. In some cases, there may be a residual layer 120 of the material used to form the nanostructured catalyst support elements between the carrying substrate 115 and the nanostructured thin catalytic layer 125. The residual layer is typically the left over materials used to form the nanostructured catalyst support elements. For example, when the nanostructured thin catalytic layer is a layer of whiskers made from perylene red, the residual layer is non-crystallized perylene red. For other nanostructured thin catalytic layers, the residual layer would be different. For example, it might be Fe or Ni catalysts used to grow carbon nanofibers or carbon nanotubes.

Suitable electrocatalyst decals comprising whiskers made from perylene red on a polyimide substrate known as NSTF catalyst layers are available from 3M. Other electrocatalyst decals with nanostructured thin catalytic layers could also be used. The nanostructured catalytic materials are either uniformly dispersed on the substrate or dispersed in a desired pattern. For example, aligned carbon nanotubes, aligned carbon nanofibers, or nanoparticles, and the like with uniformly dispersed catalyst could be used. Electrocatalyst decals incorporating such materials are described, for example, in Hatanaka et al., PEFC Electrodes Based on Vertically Oriented Carbon Nanotubes, $210^{th}$ ECS Meeting, Abstract #549 (2006); Sun et al., Ultrafine Platinum Nanoparticles Uniformly Dispersed on Arrayed $CN_x$ Nanotubes with High Electrochemical Activity, Chem. Mater. 2005, 17, 3749-3753; Warren et al., Ordered Mesoporous Materials from Metal Nanoparticle-Block Copolymer Self-Assembly, Science Vol. 320, 1748-1752 (27 Jun. 2008).

Figure 1C:
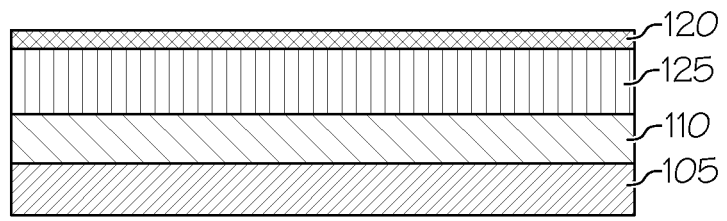

The nanostructured thin catalytic layer 125 is placed in contact with the adhesive layer 110 to form a composite structure. Suitable processes include, but are not limited to, static pressing with heat and pressure, or for continuous roll production, laminating, nip rolling, or calendering. The carrying substrate 115 is then removed (for example, by peeling off the carrying substrate). As shown in FIG. 1C, after the carrying substrate is removed, the residual layer 120 (if present) remains on the nanostructured catalytic layer 125.

Figure 1D:
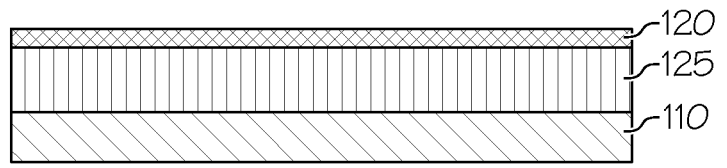

The adhesive layer 110 with the nanostructured thin catalytic layer 125 and the residual layer 120 (if any) is then removed from the transfer substrate 105, forming the stand alone nanostructured thin catalytic film, as shown in FIG. 1D. The adhesive layer with nanostructured thin catalytic layer can be removed from the transfer substrate by peeling it off, for example.

Because of the transfer of the nanostructured thin catalytic layer from the carrying substrate to the transfer substrate, the nanostructured thin catalytic layer is inverted on the transfer substrate compared to the carrying substrate. In other words, after the transfer, the surface of the nanostructured thin catalytic layer that was exposed on the carrying substrate is adjacent to the transfer substrate, while the surface that was adjacent to the carrying substrate is exposed. The surface that was adjacent to the carrying substrate can contain residual materials that were used to form the nanostructured catalyst support elements (e.g., residual non-crystallized perylene red, or catalysts that were used to grow carbon nanofibers or carbon nanotubes, and the like), which can be cleaned through later treatment, if desired.

The present method is simple and flexible. Once the stand alone nanostructured thin catalytic film is prepared through the single transfer process described above, it can be used as a building block to fabricate the desired electrode structure in either CCM or CCDM format. For example, no pretreatment of the gas diffusion layer is required to make the CCDM as described in U.S. application Ser. No. 12/718,306. Multiple layers of nanostructured thin catalytic layers can be made by stacking as many stand alone nanostructured thin catalytic films as needed; multiple transfers as described in U.S. application Ser. No. 12/465,913 and 12/718,330 are not required. The interlayers in-between the nanostructured thin catalyst layers can be easily applied through additional coating or by including the interlayer components in the adhesive layer. In addition, the nanostructured thin catalytic layer(s) can easily be made into an electrode in any preferred direction (up or down) or orientation simply by rotating and/or flipping the stand alone nanostructured thin catalytic film to place it in the desired orientation during the electrode preparation if the nanostructured thin catalytic layer has pre-existed or predesigned structures (e.g. interface 120 in FIG. 1) or patterns (e.g. corrugation or nonuniform catalyst loading) on the carrying substrate. The nanostructured catalytic elements can be harvested easily simply by dissolving the stand alone nanostructured thin catalytic film in a solvent and cleaning with an automatic process. The transfer substrate can be reused, if desired. The adhesive can be collected and recycled, if desired. No harmful or wasteful materials are generated in the process.

The adhesive can be removed, and any residual material (e.g., non-crystallized perylene red used to make whiskers, or catalysts used to make carbon nanotubes, and the like) can also be removed, if desired. Additional layers can be incorporated into the structure to increase the water storage capacity, if desired. Ionic conducting components can be incorporated into the nanostructured thin catalytic matrix, if desired. An electrode incorporating such a nanostructured thin catalytic layer provides good performance over a wider range of operating conditions, and takes advantage of its high catalytic activity and resistance to corrosion under certain fuel cell operating conditions The benefits of using this stand alone nanostructured thin catalytic film in the preparation of desired electrode structures, such as those described in U.S. application Ser. Nos. 12/465,913, 12/718,330, 12/718,306, and 12/701,095, are described below.

U.S. patent application Ser. No. 12/465,913, which is incorporated herein by reference, describes a method of transferring nano structured thin catalytic layers from a carrying substrate to a porous transfer substrate coated with an adhesive. The transferred nanostructured thin catalytic layer can be further processed on the transfer substrate, if desired. Such further processing includes, but is not limited to, one or more of, removing any residual material on the nanostructured thin catalytic layer (e.g., non-crystallized perylene red used to form a nanostructured thin catalytic layer of whiskers, or catalysts used to make carbon nanotubes, and the like), incorporating additional layers/materials to construct an improved electrode containing the nanostructured thin catalytic layer (e.g., to increase the water storage capacity, or to increase conductivity). The porous transfer substrate with the transferred nanostructured thin catalytic layer can then be pressed against a PEM to transfer the reconstructed electrode containing the nanostructured thin catalytic layer from the transfer substrate to the PEM, followed by removal of the transfer substrate, to fabricate the membrane electrode assembly (MEA) or catalyst coated membrane (CCM) for use in fuel cell stack.

U.S. application Ser. No. 12/718,306, which is incorporated herein by reference, describes a method of making a catalyst coated gas diffusion media comprising a carbon fiber layer and an adjacent microporous layer is described. The nanostructured thin catalyst layer can be transferred to the microporous layer side of the gas diffusion media, in which the gas diffusion media is pretreated with a temporary adhesive to ensure the integrity of microporous layer adhesion to the carbon fiber paper. The nanostructured thin catalytic layer on the gas diffusion media layer can be further processed, if desired. Such further processing includes, but is not limited to, incorporating additional layers/materials to construct an improved electrode containing the nanostructured thin catalytic layer (e.g., to increase the water storage capacity, or to increase conductivity). The gas diffusion media layer with the transferred nanostructured thin catalytic layer can be laminated to a proton exchange membrane (PEM) to fabricate the membrane electrode assembly (MEA) for use in fuel cell stack.

U.S. application Ser. No. 12/718,330, which is incorporated herein by reference, describes a method of making reconstructed electrode decals having a plurality of nanostructured thin catalytic layers. The two or more nanostructured thin catalytic layers on the acceptor decal substrate can be further processed, if desired. Such further processing includes, but is not limited to, incorporating additional layers/materials to construct an improved electrode (e.g., to increase the water storage capacity, or to increase conductivity). The reconstructed electrode decal with the plurality of nanostructured thin catalytic layers can be combined with proton exchange membranes (catalyst coated membrane (CCM)) or diffusion media (catalyst coated diffusion media (CCDM)) and used to fabricate the membrane electrode assembly (MEA) for use in fuel cell stack.

U.S. application Ser. No. 12/701,095, which is incorporated herein by reference, describes a method of harvesting a nanostructured thin catalyst from its carrying substrate and incorporating it into an ink for further electrode fabrication. The electrode ink can be coated onto a substrate including, but not limited to, an electrode decal, a proton exchange membrane, or diffusion media. These coated structures can then be used in MEAs.

To simplify the discussion in the following illustrations, a nanostructured thin catalytic layer made from perylene red on a polyimide carrying substrate was chosen as a specific example. But in the case of other material sets, the carrying substrate would be different from the polyimide (e.g., silicon), and the nanostructured support elements could be different from the perylene red (e.g., carbon nanotubes).

Example 1

A 3M NSTF catalyst layer made from perylene red was transferred from a polyimide carrying substrate to a 50 µm thick PTFE transfer substrate, which is available from American Durafilm.

The PTFE transfer substrate was coated with a water soluble PVA (molecular weight around 10,000) adhesive layer through a 15 wt % solution. The solvent was a mixture of water and isopropanol at 1:1 weight ratio. The PVA loading was about 0.8 mg/cm$^2$, and the adhesive layer was about 6 µm thick after drying.

A 3M NSTF catalyst layer supported on a carrying substrate was provided. It included a polyimide carrying substrate, and a nanostructured thin catalytic layer of whiskers made from perylene red. There was a residual layer of perylene red on the interface between the whiskers and the polyimide carrying substrate. Using a static hot press (105° C., 3.5 MPa, 4 minutes) process, the layer of whiskers was pressed against the PVA adhesive layer on the PTFE transfer substrate. The carrying substrate was then peeled off, leaving the whisker layer on the PTFE transfer substrate and the residual layer of perylene red exposed. The adhesive layer with the nanostructured thin catalytic layer was then removed by peeling it off the PTFE transfer substrate.

Figure 2A:
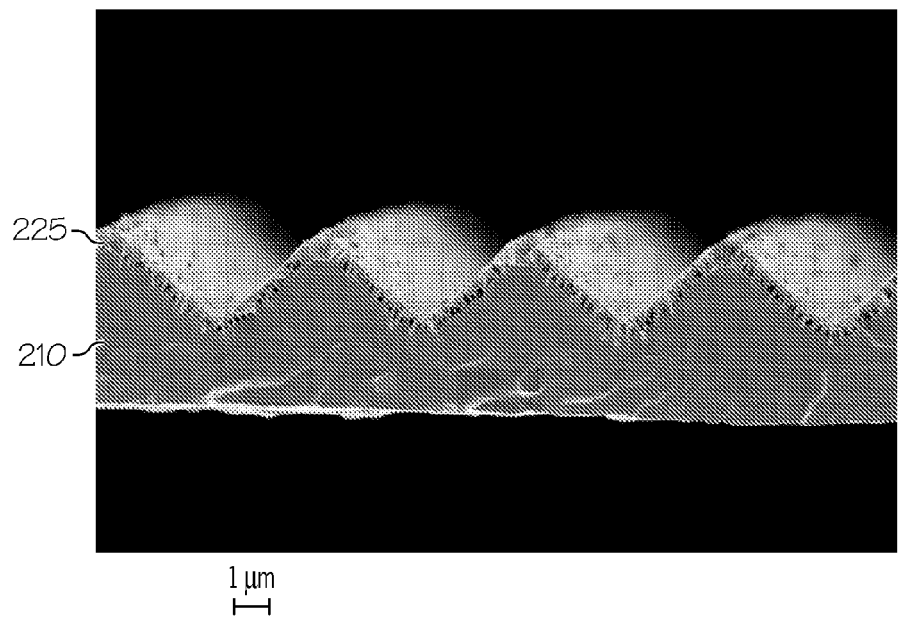
FIGS. 2A-B show SEM images of the cross-section of a stand alone nanostructured thin catalytic film.
Figure 2B:
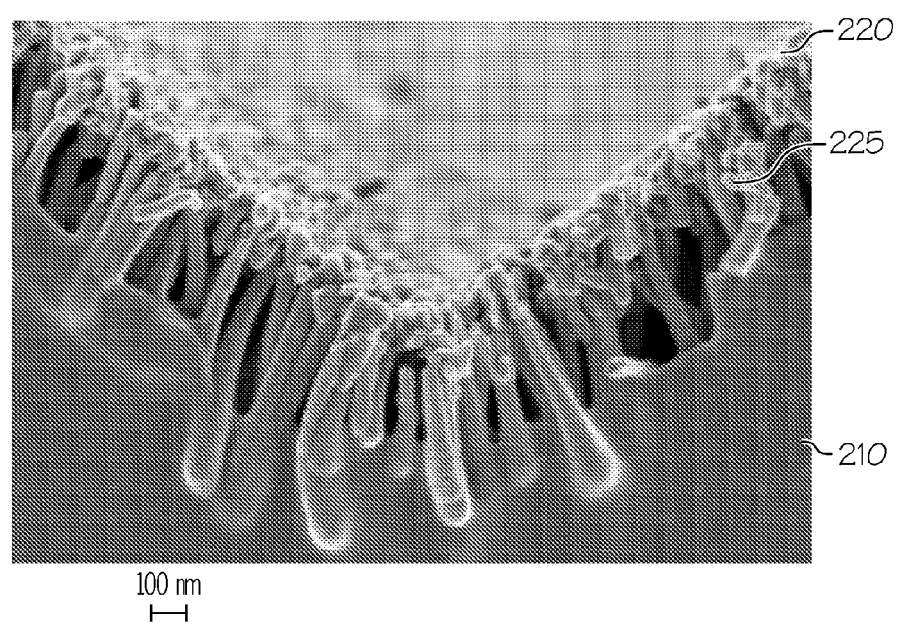

FIGS. 2A-B show SEM images of the cross section of the stand alone nanostructured thin catalytic film, showing the PVA adhesive layer 210 with the NSTF whisker layer 225 and the perylene red residual layer 220 exposed. As shown in FIG. 2A, the PVA layer deforms to accommodate the corrugation structure of the NSTF on its polyimide carrying substrate. The corrugation is maintained after the stand alone nanostructures thin catalytic film of PVA with NSTF is peeled off the PTFE transfer substrate.

The stand alone nanostructured thin catalytic film can be used to fabricate an electrode with desired structures, as illustrated in FIGS. 3A-C and 4A-C. The stand alone nanostructured thin catalytic film 330 includes the adhesive layer 310, the nanostructured thin catalytic layer 325 and the residual layer 320. The stand alone nanostructured thin catalytic film 330 is placed on a porous substrate 335. The stand alone nanostructured thin catalytic film can simply be laid down in a continuous process. Optionally, heat, pressure, and/or moisture can be used to help the process or improve handling capability. However, this is not required. The porous substrate can have an optional layer 340 of catalyst or carbon. The adhesive layer 310 is in contact with the porous substrate 335 or optional layer 340.

The optional layer can include one or more of adhesive; ionomer; conductive particles, including but not limited to, carbon powder, and carbon fiber; catalyst; titanium dioxide; silica; nanofibers; nanotubes; or combinations thereof. For example, an ionomer can be added to increase the proton conduction under dry conditions. A hydrophobic component, such as PTFE particles, can be included to improve wet performance.

Conductive particles, such as carbon (powder, fibers, or both), or catalyst (typically the catalyst would be on a carbon support) can be included to increase the overall electrode thickness and thus improve the product water storage capability.

More durable conductive particles can also be used to provide void space within the electrode for product water storage. Suitable compounds include, but are not limited to, conductive borides, carbides, nitrides, and silicides (B, C, N, Si). Suitable metals for the conductive particles include, but are not limited to Co, Cr, Mo, Ni, Ti, W, V, Zr. The use of such compounds, for example, TiN, is described in US Publication 2006/251954. One advantage of nanostructured thin catalytic layers over carbon supported electrodes is durability enhancement because the carbon support is susceptible to corrosion especially during fuel cell startup. These other conductive materials have not been fully suitable for electrode supports because they do not provide enough surface area, and consequently, Pt dispersion, as is obtainable with carbon. However, for the present use, the conductive particles would only need to function to provide void space and conductivity but not catalyst support, so the high surface area is not needed. Material durability is needed in the acidic and high electrochemical potential fuel cell environment. Thus, their use would be acceptable.

Titanium dioxide and/or silica, which are hydrophilic and could be used to retain product water under dry conditions, can also be included. The addition of non-conductive particles such as titanium dioxide or silica would likely require the addition of a conductive material to provide the electrical conductivity function. Ionomer could also be added to this layer or be pulled in by later coating processes to provide the needed protonic conductivity for this layer.

Nanofibers and/or nanotubes, which can be used as structural materials to incorporate into the intermediate layer, can also be used.

Figure 3A:
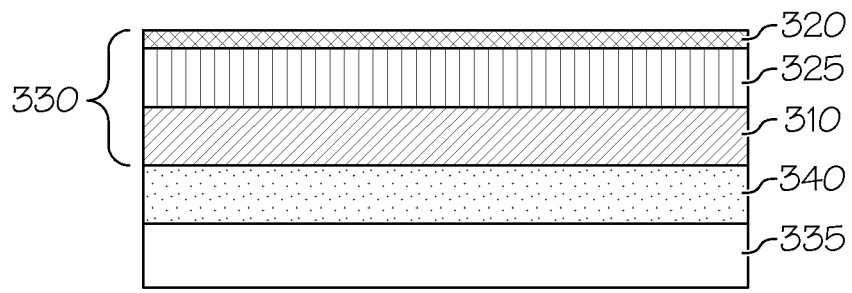
FIGS. 3A-C are an illustration of a method of fabricating an electrode decal using a stand alone nanostructured thin catalytic film according to one or more embodiments of the present invention.
Figure 3B:
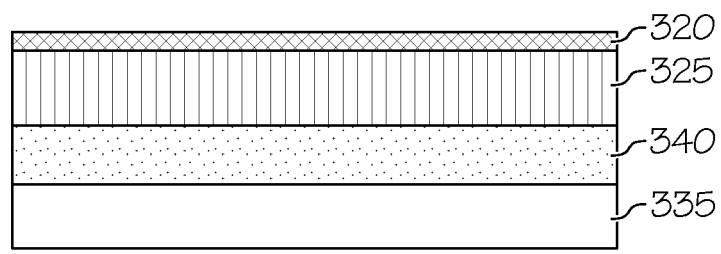
Figure 3C:
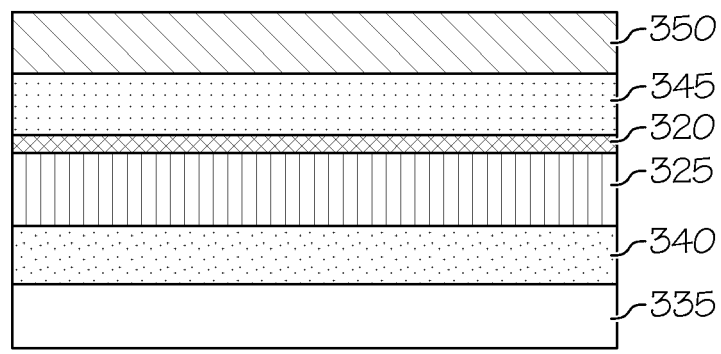

A solvent, which will dissolve the adhesive and also wet the porous substrate 335 or 435, can then be coated on the assembly to remove the adhesive, as shown in FIG. 3B. For example, if PVA is used as the adhesive and expanded PTFE used as the porous substrate, a mixture of water and isopropanol can be used as the solvent. The assembly can optionally be further cleaned and treated, for example to remove the residual layer. The pores in the porous substrate act as the drain for the waste removal.

Additional optional layers can be coated on the assembly, if desired. For example, a layer 345 of catalyst or carbon can be applied, followed by a layer of ionomer 350. The optional layers can be as described above.

A vacuum can be applied during the removal of the adhesive layer, and/or the removal of the residual layer, and/or the deposition of the additional layer, if desired.

The decal with the reconstructed electrode can then be used to make a CCM or CCDM.

Figure 4A:
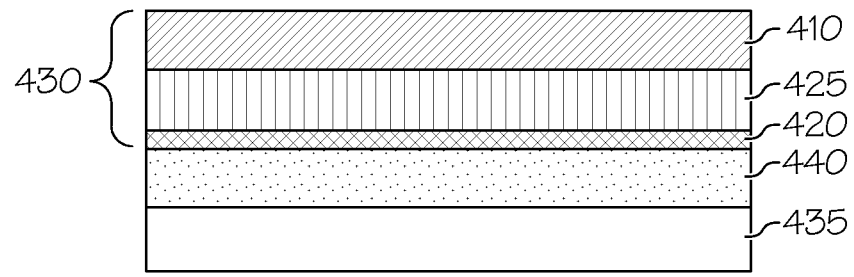
FIGS. 4A-C are an illustration of another method of fabricating an electrode decal using a stand alone nanostructured thin catalytic film according to one or more embodiments of the present invention.
Figure 4B:
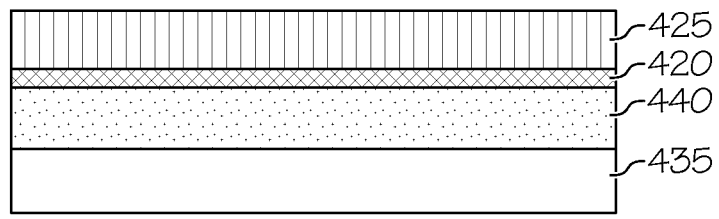
Figure 4C:
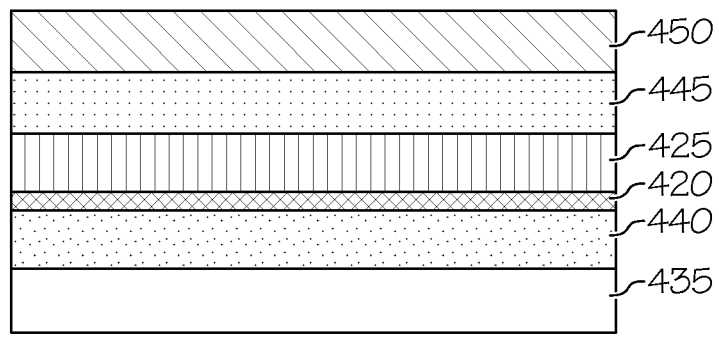

FIGS. 4A-C show a similar process. In this case, the residual layer 420 is placed in contact with the porous substrate 435 or optional layer 440. The orientation of the nanostructured thin catalytic layer (whether the nanostructured thin catalytic layer or the residual layer is in contact with the porous layer) can easily be changed simply by changing the way the stand alone nanostructured thin catalytic film is positioned.

Figure 5A:
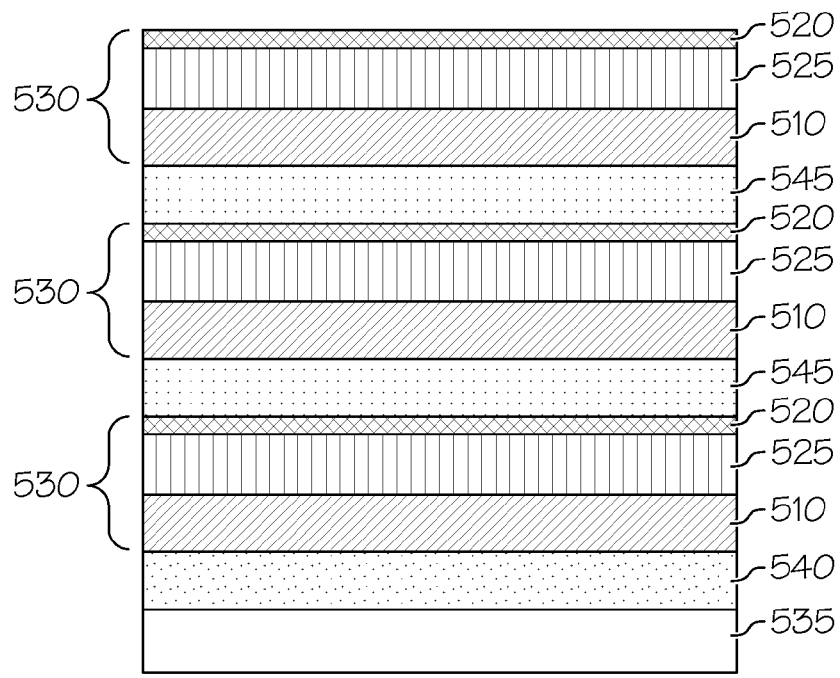
FIGS. 5A-B are illustrations of an electrode decal having multiple nanostructured thin catalytic layers made using stand alone nanostructured thin catalytic films according to one or more embodiments of the present invention.
Figure 5B:
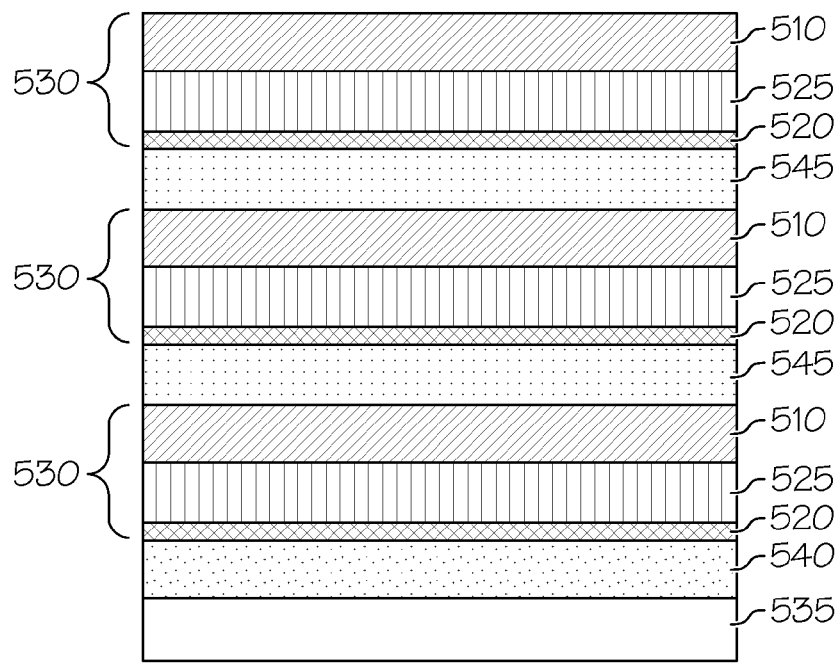

A CCM with multiple nanostructured thin catalytic layers can be prepared by placing two or more stand alone nanostructured thin catalytic films 530 on a porous substrate 535 with an optional layer 540, as shown in FIGS. 5A-B. FIG. 5A shows three stand alone nanostructured thin catalytic films 530 in which the adhesive layer 510 is in contact with the previous layer. There can be optional layers 545 between the stand alone nanostructured thin catalytic films, if desired. In FIG. 5B, the residual layer 520 is in contact with the previous layer.

A solvent can then be coated on the assembly to remove the adhesive. The assembly can optionally be further cleaned and treated. The pores in the porous substrate act as the drain for the waste removal.

Figure 6A:
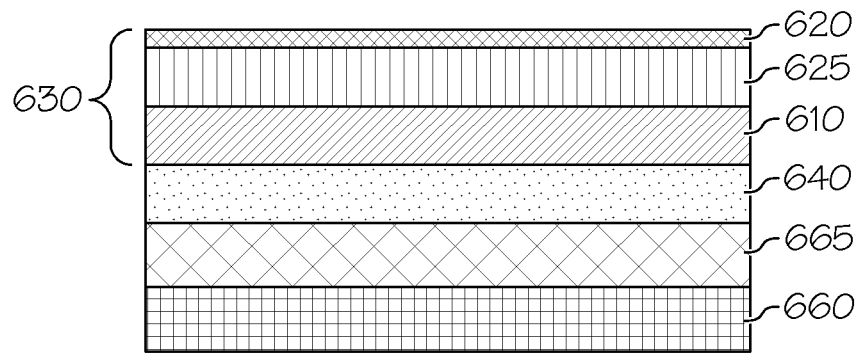
FIGS. 6A-C are an illustration of a method of fabricating a catalyst coated diffusion media using a stand alone nanostructured thin catalytic film according to one or more embodiments of the present invention.
Figure 6B:
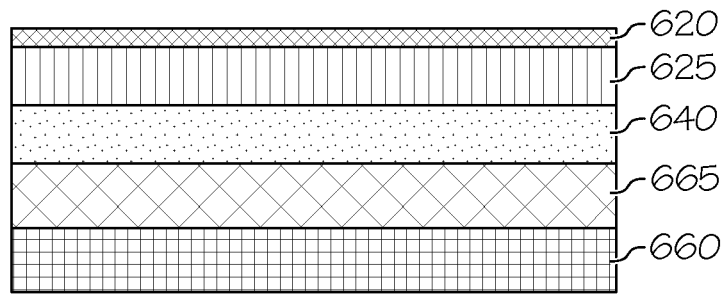
Figure 6C:
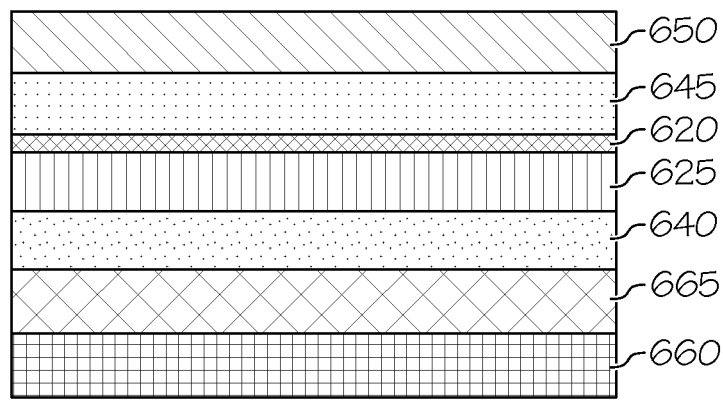
Figure 7A:
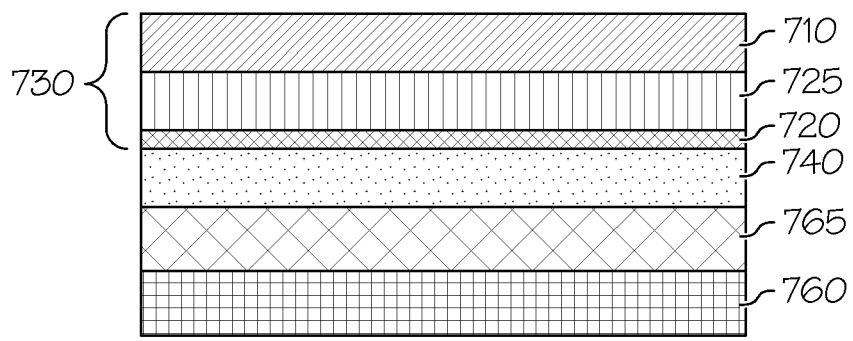
FIGS. 7A-C are an illustration of another method of fabricating a catalyst coated diffusion media using a stand alone nanostructured thin catalytic film according to one or more embodiments of the present invention.
Figure 7B:
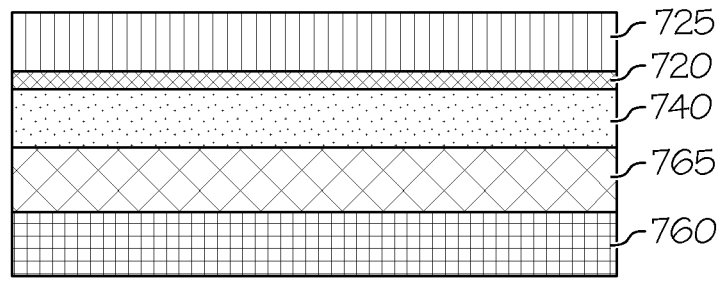
Figure 7C:
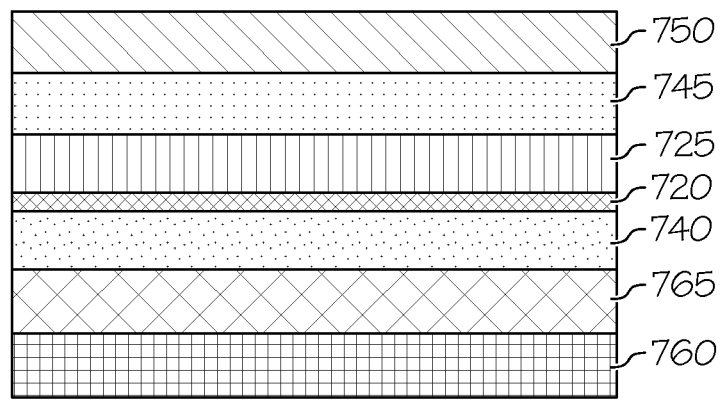

FIGS. 6A-C and 7A-C show a method of making a CCDM using the stand alone nanostructured thin catalytic film. A layer of diffusion media having a carbon fiber layer 660 and a microporous layer 665 is provided. An optional layer 640 can be on the microporous layer 665. A stand alone nanostructured thin catalytic film 630 is placed on the optional layer 640. The assembly is then coated with a solvent to remove the adhesive layer 610. Additional optional layers can be applied over the nanostructured thin catalytic layer, such as a catalyst or carbon layer 645 and an ionomer layer 650, if desired. In FIGS. 6A-C, the adhesive layer 610 is placed on the optional layer 640 (or microporous layer 665), while in FIGS. 7A-C, the residual layer 720 is placed on the optional layer 740 (or microporous layer 765).

Example 2

A CCDM was made using a 3M NSTF catalyst layer made from perylene red.

A gas diffusion media having a carbon fiber substrate (MRC105 from Mitsubishi Rayon Inc.) 660 and 760 and a microporous layer 665 and 765 containing a mixture of acetylene back and PTFE is provided.

A 3M NSTF catalyst layer supported on a carrying substrate was provided. It included a polyimide carrying substrate, and a nanostructured thin catalytic layer of whiskers made from perylene red. There was a residual layer of perylene red on the interface between the whiskers and the polyimide carrying substrate. Using a static hot press (105° C., 3.5 MPa, 4 minutes) process, the layer of whiskers was pressed against the PVA adhesive layer on the PTFE transfer substrate. The carrying substrate was then peeled off, leaving the whisker layer on the PTFE transfer substrate and the residual layer of perylene red exposed. The adhesive layer with the nanostructured thin catalytic layer was then removed by peeling it off the PTFE transfer substrate.

The stand alone nanostructured thin catalytic film was placed on the microporous layer of a layer of diffusion media. A solvent mixture of water and isopropanol at 1:1 weight ratio was coated on top of the stand alone nanostructured thin catalyst layer 620 a couple of times. The PVA was thus removed and drained through the pores of the gas diffusion media.

Figure 8A:
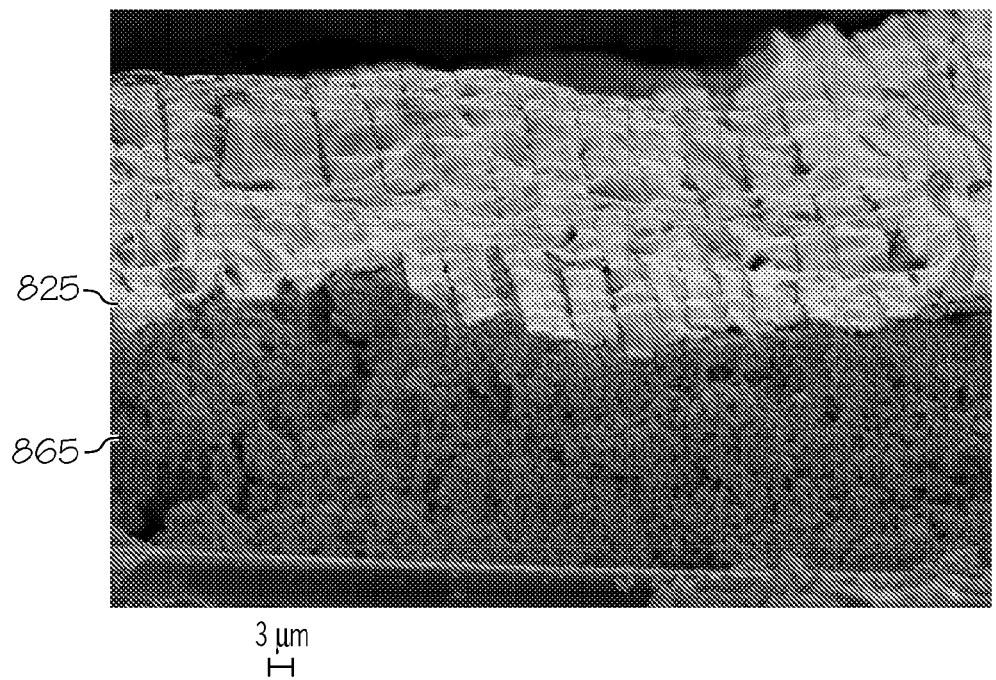
FIGS. 8A-B show SEM images of the cross-section of a nanostructured thin catalytic layer on an MPL after removal of the adhesive layer.
Figure 8B:
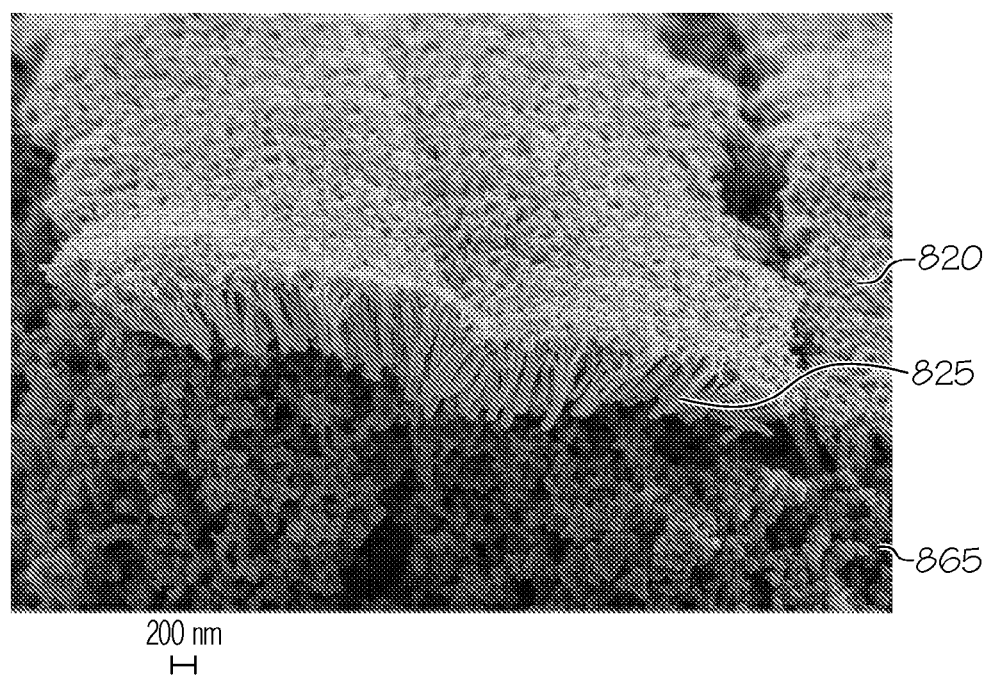

FIGS. 8A-B show SEM images of the cross section of the stand alone nanostructured thin catalytic layer 825 on the microporous layer 865 prepared via the process described in FIG. 6, showing the nanostructured thin catalytic layer 825 and the perylene red residual layer 820 exposed. The PVA layer was completely removed.

Figure 9:
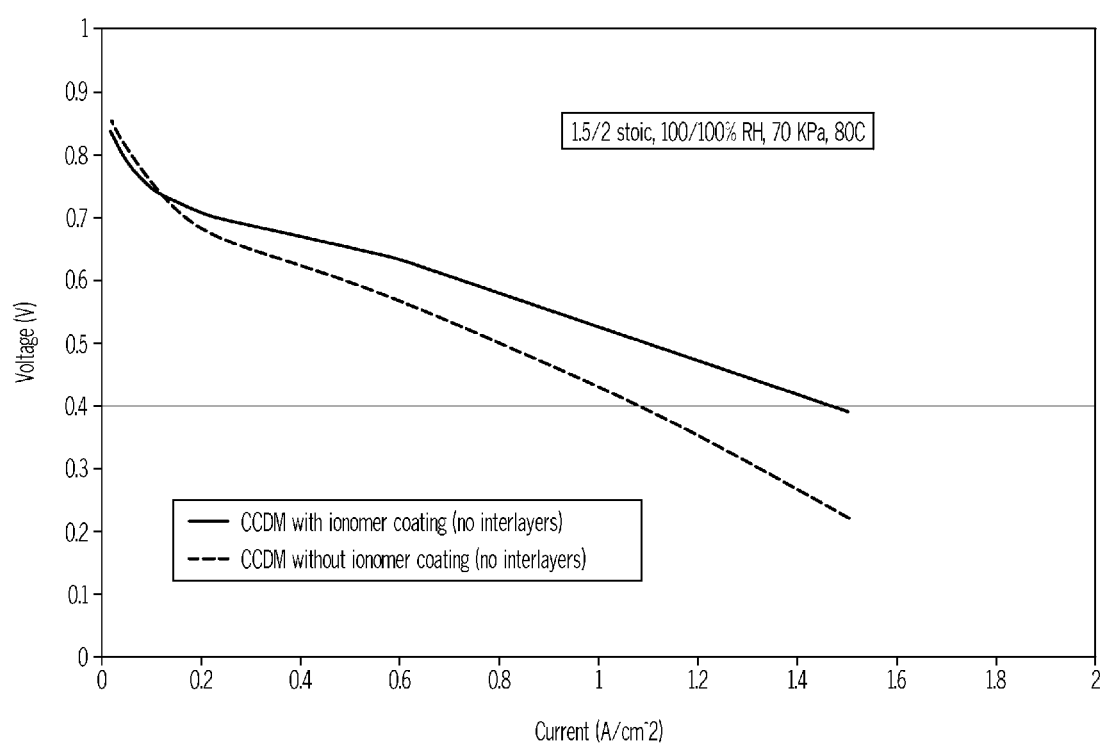
FIG. 9 is a graph showing the fuel cell performance of catalyst coated diffusion media shown in FIG. 8 and made using a stand alone nanostructured thin catalytic film (0.15 mg Pt/cm$^2$)

FIG. 9 compares the performance of an MEA made with the CCDMs shown in FIG. 8 with and without an additional ionomer layer coated on top of the nanostructured thin catalytic layer. The Pt loading of the 3M NSTF catalytic layer was 0.15 mg/cm$^2$. The ionomer coating was from a solution diluted from DuPont Nafion® DE2020 ionomer and Nafion® NRE211 was used as the proton exchange membrane.

The electrode of Example 2 showed the same HAD (hydrogen adsorption/desorption) area (greater than or equal to 10 m$^2$/g Pt after a break-in protocol) as the prior art MEA made by compressing the 3M NSTF catalyst layer directly onto the proton exchange membrane. Both electrodes with and without ionomer coating showed similar HAD areas when the scan was run to 0.6 V and 1.1 V versus SHE reference electrode during cyclovoltammetry measurements. This indicates that no contaminants were introduced into the reconstructed electrodes containing the nanostructure thin catalytic layer because most of the contaminants would be oxidized at 1.1V if present and that would have resulted in an increased HAD area. Under the fully humidified test condition as shown, 100% inlet relative humidity for both the anode and cathode at 70 kPa gauge pressure and 80° C., the ionomer coated sample performs better than the one without the ionomer coating.

Figure 10A:
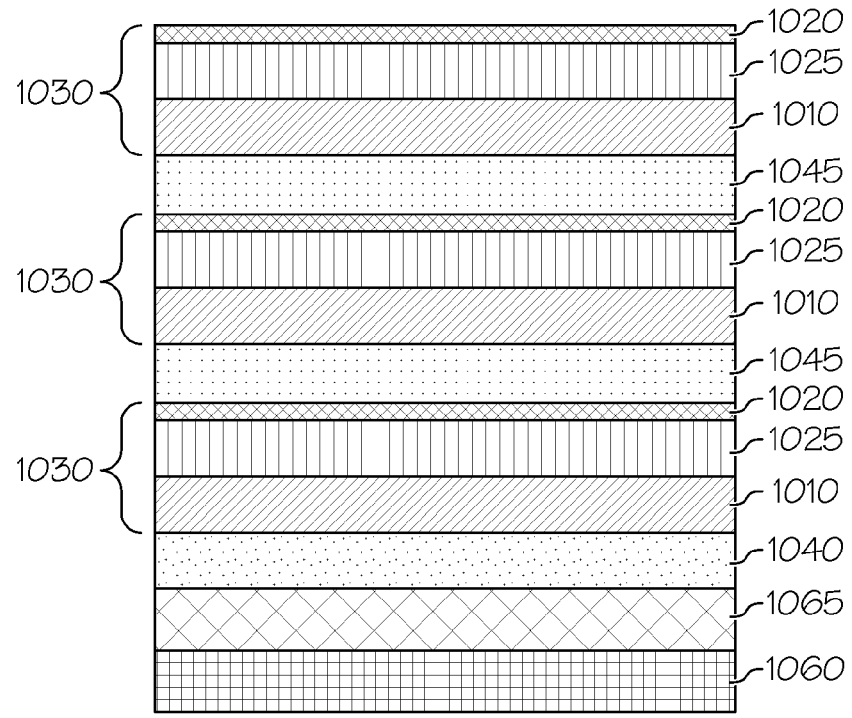
FIGS. 10A-B are illustrations of catalyst coated diffusion media having multiple nanostructured thin catalytic layers made using stand alone nanostructured thin catalytic films according to one or more embodiments of the present invention.
Figure 10B:
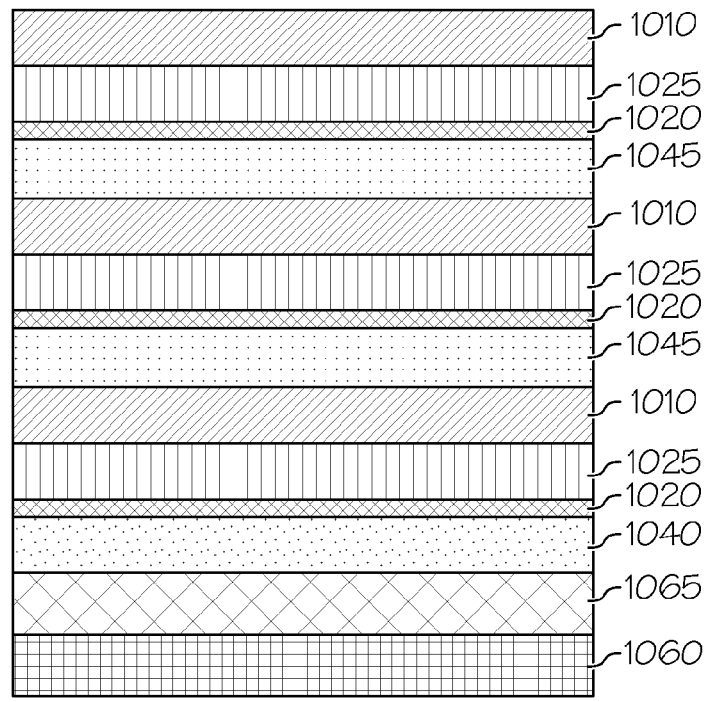

A CCDM with multiple nanostructured thin catalytic layers can be prepared by placing two or more stand alone nanostructured thin catalytic films 1030 on the microporous layer 1065 of a layer of diffusion media with an optional layer 1040, as shown in FIGS. 10A-B. FIG. 10A shows three stand alone nanostructured thin catalytic films 1030 in which the adhesive layer 1010 is in contact with the previous layer. There can be optional layers 1045 between the stand alone nanostructured thin catalytic films 1030, if desired. In FIG. 10B, the residual layer 1020 is in contact with the previous layer.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of making an electrode comprising:
providing an electrocatalyst decal comprising a carrying substrate having a nanostructured thin catalytic layer thereon;
providing a transfer substrate with an adjacent adhesive layer;
adhering the nanostructured thin catalytic layer adjacent to the adhesive layer to form a composite structure;
removing the carrying substrate from the composite structure; and
removing the transfer substrate from the composite structure to form a stand alone nanostructured thin catalytic film comprising the adhesive layer with the nanostructured thin catalytic layer adhered thereto.

2. The method of claim 1 further comprising depositing an additional layer on the stand alone nanostructured thin catalytic film, the additional layer comprising at least one of an ionomer, conductive particles, carbon powder, carbon fibers, catalyst, titanium dioxide, silica, nanofibers, or nanotubes.

3. The method of claim 1 wherein the adhesive layer comprises a water soluble adhesive.

4. The method of claim 1 wherein the adhesive layer further comprises at least one of an ionomer, conductive particles, carbon powder, carbon fibers, catalyst, titanium dioxide, silica, nanofibers, or nanotubes.

5. The method of claim 1 further comprising placing the stand alone nanostructured thin catalytic film on a microporous layer side of a gas diffusion media, and removing the adhesive layer to form a catalyst coated diffusion media.

6. The method of claim 5 further comprising depositing an additional layer on the microporous layer before placing the stand alone nanostructured thin catalytic film thereon, the additional layer comprising at least one of an ionomer, conductive particles, carbon powder, carbon fibers, catalyst, titanium dioxide, silica, nanofibers, or nanotubes.

7. The method of claim 5 further comprising depositing an additional layer on the stand alone nanostructured thin catalytic film, the additional layer comprising at least one of an ionomer, conductive particles, carbon powder, carbon fibers, catalyst, titanium dioxide, silica, nanofibers, or nanotubes.

8. The method of claim 5 wherein there are at least two stand alone nanostructured thin catalytic films.

9. The method of claim 8 further comprising depositing an additional layer on the first or second stand alone nanostructured thin catalytic films or both, the additional layer comprising at least one of an ionomer, conductive particles, carbon powder, carbon fibers, catalyst, titanium dioxide, silica, nanofibers, or nanotubes.

10. The method of claim 1 further comprising placing the stand alone nanostructured thin catalytic film on a porous substrate, and removing the adhesive layer to form an assembly.

11. The method of claim 10 further comprising depositing an additional layer on the porous substrate before placing the stand alone nanostructured thin catalytic film thereon, the additional layer comprising at least one of an ionomer, conductive particles, carbon powder, carbon fibers, catalyst, titanium dioxide, silica, nanofibers, or nanotubes.

12. The method of claim 10 further comprising depositing an additional layer on the stand alone nanostructured thin catalytic film, the additional layer comprising at least one of an ionomer, conductive particles, carbon powder, carbon fibers, catalyst, titanium dioxide, silica, nanofibers, or nanotubes.

13. The method of claim 10 wherein there are at least two stand alone nanostructured thin catalytic films.

14. The method of claim 13 further comprising depositing an additional layer on the first or second stand alone nanostructured thin catalytic film or both, the additional layer comprising at least one of an ionomer, conductive particles, carbon powder, carbon fibers, catalyst, titanium dioxide, silica, nanofibers, or nanotubes.

15. The method of claim 10 further comprising transferring the assembly onto a first side of a proton exchange membrane.

16. The method of claim 15 further comprising transferring a second assembly onto a second side of the proton exchange membrane.

17. The method of claim 10 further comprising transferring the assembly onto a microporous layer side of a gas diffusion media, the microporous layer treated with a second adhesive layer.

18. The method of claim 1 further comprising:
placing the stand alone nanostructured thin catalytic film in a solvent;
dissolving the adhesive layer to release nanostructured thin catalytic elements forming a solution of the nanostructured thin catalytic elements;
separating the nanostructured thin catalytic elements from the solution; and
dispersing the nanostructured thin catalytic elements in an electrode ink solvent.

* * * * *